(No Model.)
A. MITSCHERLICH.
PROCESS OF AND APPARATUS FOR UTILIZING HORN OR SIMILAR MATERIAL.
No. 602,237. Patented Apr. 12, 1898.
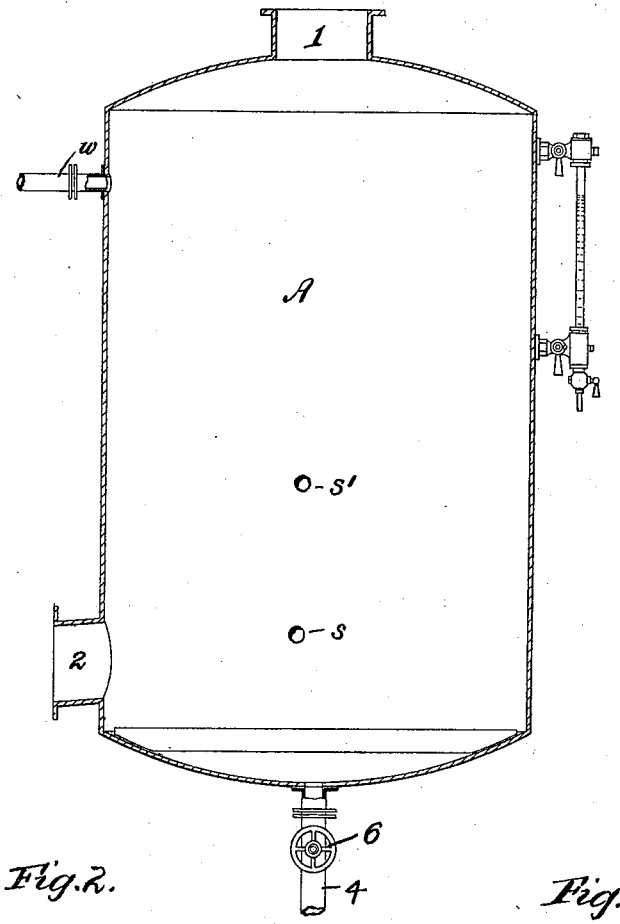
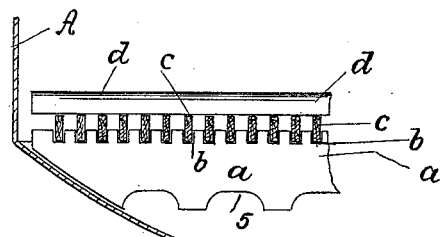
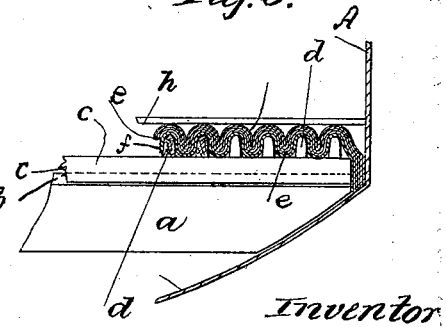
Witnesses:
G. W. A. Eisenbraun
Eugene A. Persides
Inventor
Alexander Mitscherlich
by A. Faber du Faur
Atty.

ved waters of the boiler. Said boiler is provided
UNITED STATES PATENT OFFICE.

ALEXANDER MITSCHERLICH, OF FREIBURG, GERMANY.

PROCESS OF AND APPARATUS FOR UTILIZING HORN OR SIMILAR MATERIAL.

SPECIFICATION forming part of Letters Patent No. 602,237, dated April 12, 1898.

Application filed November 26, 1895. Serial No. 570,216. (No model.)

*To all whom it may concern:*

Be it known that I, ALEXANDER MITSCHERLICH, professor of chemistry and doctor of philosophy, a subject of the King of Prussia, Emperor of Germany, residing at Freiburg, Grand Duchy of Baden, German Empire, have invented new and useful Improvements in Processes of Utilizing Horn and Horn-Like Matters, of which the following is a specification.

My invention relates to a process of and apparatus for the utilization of waste ceratin or similar matters which hitherto could be rendered utilizable only with the greatest difficulty. It has for its object to convert said matters at a small cost into very useful adhesive matters, while at the same time certain fermentable substances which can be used for producing alcohol and phlegma (distillers' wash) are by-products of the process.

My new process consists, essentially, in dissolving the waste ceratin matter—such as horns, claws, hoofs, hair, and the like—in water at a temperature above 100° centigrade and in precipitating this solution by the tanning principle of the lyes obtained in the manufacture of sulfite cellulose. A portion of the said waste matter is advantageously dissolved in diluted soda-lye instead of water and then precipitated as above indicated. The compounds of the tanning principle produced are then redissolved in water, with the addition of a small quantity of soda, and used as adhesive matters. When the raw lye is used for precipitating the tanning principle, there remains in the mother-lye besides the nitrogenous matters not previously precipitated (which latter after separation may be used also as an adhesive matter) the fermentable body contained in the sulfite lye and which may be attenuated or fermented.

The expression "sulfite lye" is here used to indicate a waste lye resulting from the digesting of wood in paper-pulp or cellulose manufacture. This lye contains a tanning principle extracted from the wood.

Figure 1 is a vertical section of a boiler or digester adapted for carrying out my new process. Fig. 2 is a vertical section, on an enlarged scale, illustrating the construction of the filter at the bottom of the boiler, part being broken away. Fig. 3 is a similar section taken at right angles to Fig. 2.

Similar letters and numerals of reference designate corresponding parts throughout the several views of the drawings.

The general process forming the base for the industrial working is as follows: The waste ceratin matter to be treated is introduced into an iron boiler A, provided with an acid-proof lining and having a capacity of about five cubic meters. Said boiler is provided with the usual fittings and manholes 1 2 for charging and discharging and with devices $w$, $s$, and $s'$ for admitting hot water and steam. Hot water is admitted to the closed vessel, which, if necessary, is heated to and maintained at a temperature of from 110° to 140° centigrade by steam. After several hours the water contains three per cent. dissolved matter. The material is gradually completely softened and dissolved by the water. The water from time to time, as may be necessary, is renewed in the boiler, so that there finally remains in the water an insoluble residue. This residue is removed from time to time from the boiler, while fresh matter is added several times at suitable intervals.

The residue, ordinarily containing larger quantities of undissolved horn, is subjected to the following treatment for utilizing it: With frequent stirring it is dissolved in diluted (two and one-half per cent.) soda-lye, and if the mass is viscid it is diluted and heated at the same time. An admixture to the mass of soda and slaked lime in excess acts similarly to the soda-lye, particularly when the mass in itself is more compact. The soda combines with the horn and the lime combines with the carbonic acid of the soda and with the sulfur in the horn.

If the raw waste matter to be worked is soluble with difficulty in water, it is advisable to dissolve it according to the above-mentioned process, which is the quicker; but when horn, as above described, is treated in the boiler turbidness is easily produced in the resulting highly-concentrated solution. Owing to the viscidity of the solution and to the fineness of the suspended bodies they are not deposited, whereby the further treatment would be prejudicially influenced. To avoid this turbidness, also that which may be produced by careless boiling or by mud, without retarding, however, the speed of outflow from the boiler, I use a peculiar filtering device in the boiler, which is capable of resisting high pressures. This filtering device is constructed as follows: On the bottom of the boiler there are arranged thick plates $a$ of sandstone or of another material indestructible by the boiling liquid. These plates have a width of about three hundred millimeters and are provided at the bottom with notches 5, disposed at suitable intervals apart, so that the liquid can easily communicate between the plates and the bottom. The plates are adapted to the side walls of the boiler. Across the plates are cut parallel grooves $b$ at a distance of about twenty millimeters, the depth of the grooves being fifteen millimeters and their width ten millimeters. Into these grooves are driven strips $c$, made of resistant dry wood, (pitch-pine,) thirty millimeters in height and projecting, therefore, fifteen millimeters over the surface, so that by swelling after they have become wet they are held firmly in the said grooves. At right angles to these strips and at a distance of about ten millimeters are nailed ledges $d$, twelve millimeters in height and eight millimeters in width. Between and upon these ledges is arranged a filter-cloth $e$, which is as resistible as possible, and under and against the said cloth are loosely attached foraminous layers $f$ of fabric for the purpose of protecting the filter-cloth against any contact with bodies impenetrable to water, so that no portion of the filter-surface is lost.

In order to obtain the largest possible and most rapid filtration, the filter-cloth is arranged in plaits, which are made as numerous as possible, and it is pressed into the hollow spaces between each two ledges and finally between the bottom and the wall of the boiler. The whole filtering device is then secured by means of some rigid laths $h$, so that a sieve is formed having the largest possible filtering-surface without occupying an excessive space.

With the use of this apparatus the process is carried out as follows: The horn is at first steamed in the boiler at atmospheric pressure, the water of condensation being allowed to flow off at a temperature of 100° centigrade, and then the pressure is increased to over two atmospheres, the water of condensation passing off at about 110° centigrade. Steam is admitted through the pipe $s$, entering the boiler about two hundred millimeters above the bottom of the filter. When there is liquid above the sieve, the steam is admitted at a higher level in order to avoid fluctuations in the proximity of the sieve. By steaming the horn it is prepared for being more easily and rapidly dissolved. Water under a pressure of three or four atmospheres is then admitted into the boiler until it becomes visible in the water-gage arranged in the upper part of the boiler, whereupon the discharge-valve at the lower part of the boiler is opened a little. Owing to the high pressure existing in the boiler the horn solution is forced out of the vessel; but prior to its outflow it is completely filtered and escapes rapidly in a clear condition, first as a diluted solution, which, however, gradually becomes more and more concentrated. The solution slowly flowing out at the beginning of the process is tested. As soon as it indicates more than 1° Baumé it is caused to flow out more rapidly and the proportional quantity of water is admitted, which is regulated in such a manner that at a pressure of three or three and one-half atmospheres (which, however, should not be higher than four atmospheres) the water can still be seen in the upper water-gage. When the strength of the discharging horn solution falls below 1° Baumé, the water-supply is cut off and the rest of the liquid is forced, say by steam, out of the boiler.

The effect of the process may be described as follows: By the hot water the horn is converted throughout its whole body into a soft mass rapidly soluble in part in water. The insoluble residue remains very compact. As the material is not steamed directly at the bottom and from below, but at and from a higher level, all the pieces of horn remain at rest and no insoluble parts, which would render the solution turbid, are broken away. The water admitted to the boiler passes between the mass of softened horn and, without perceptible motion, takes up all the soluble matter as it flows gradually downward. The strength of the solution gradually increases and afterward decreases, and the liquid passes off from the filter in a clear condition. After the solution has run off the boiler is opened and the insoluble residue is withdrawn, whereupon, preferably, as above mentioned, soda and lime in excess are added to the same, and the mixture is then let stand. After some time the residue is almost completely dissolved in a cold condition. The application of heat facilitates the solution. There are several ways for manufacturing adhesive matters from the solutions so produced.

Adhesive matters may be obtained by adding to the solutions, in large vats, acids or acidiferous bodies—say sulfate of alumina—and then treating them with the waste lye from the sulfite-cellulose process or with the tanning principle of the same until no more precipitation takes place. The manner of obtaining this tanning principle is fully described in my prior application for a process of utilizing the lyes of sulfite cellulose, Serial No. 481,763, filed July 28, 1893. The process for obtaining this tanning principle may be briefly described as follows: Raw waste sulfite cellulose as it comes from the boiler or mixed with milk of lime up to a weak alkaline reaction or mixed with finely-divided carbonate of lime in excess to a nearly neutral reaction is subjected to the osmose process. The undiffused liquor leaving the osmose apparatus contains, together with other matter, the body capable of tanning hides. For obtaining the liquid containing this body the undiffused liquor is entirely or partially freed from lime by means of acids. If sulfuric acid is used for this purpose, two cubic centimeters of concentrated sulfuric acid are used per liter of liquor for each increase of .01 in specific gravity after a specific gravity of 1 has been reached. In place of sulfuric acid equivalent quantities of oxalic acid or of other suitable acids may be used. The acidified mass is then allowed to stand, and with concentrated solutions the greater quantity of lime separates in about twenty-four hours as gypsum, oxalate of lime, &c. If the liquor containing the tanning principle cannot be used directly, it is concentrated, then diluted again, and reprecipitated. As before stated, the raw waste lye from the sulfite-cellulose manufacture may be added directly to the solutions without any addition, such as acids (sulfuric or oxalic) for binding the lime, and so obtaining the effect of the tanning principle contained therein. The quantity of lye is dependent on the quantity of dissolved horn. So, for instance, for one measure of a five-per-cent. solution about one-half measure of ordinary lye having a specific gravity of 1.05 will be required. The precipitates produced in the vat by the admixture of the tanning principle deposits quickly and may be used a short time after the liquid has been removed or the precipitate has been washed with water. The precipitate is slightly soluble in water, but readily even in a cold dilute solution of the carbonates of alkalies, (soda.) The liquid after concentration yields the adhesive matter and a sizing material. The latter can be precipitated separately from the solution also by a small admixture of acids, acid salts, or salts of alumina. When, for instance, this precipitation is effected in paper-pulp, the solid particles contained therein will be pasted together, (sized.)

The above-indicated process does not, however, give a good yield, though the complicated operations give a pure product. Moreover, the process is not easily carried out industrially, as the combination of the tanning principle with the horn solution requires a longer period of time and in general the precipitation remains incomplete.

The following process is more rapidly and easily carried out: The sulfite lye or its tanning principle is first freed, preferably by small admixture of lime, from free acids and then mixed with the horn solution in such a proportion that for one liter of horn solution having a specific gravity of 1.03 there is added one liter of lye having a specific gravity of 1.06, or for other compositions corresponding proportions. The action of the neutralized lye or of the neutralized tanning principle differs completely from that of the ordinary sulfite lye, which latter in itself gives a strong precipitation with horn. The tanning principle contained in the neutralized lye or in the neutralized tanning principle is not precipitated by the horn solution. For producing an adhesive matter from the horn solution and lye it is necessary to precipitate the compound from the said mixture by adding acids or acid salts. By these means a complete precipitation of all horn is obtained, since each particle of tanning principle is accompanied by a particle of horn and the penetration of the acids or acid salts takes place rapidly. If the said precipitations are obtained from highly-dilute solutions, they are almost pure. By adding to the horn solutions, after diluting the same more than ten times, crude sulfite lye or sulfite lye purified by osmose and then adding acid or acid salts all the horn susceptible to precipitation is obtained, and in addition thereto a nearly pure compound of the tanning principle of the sulfite lyes, while the other constituents of the sulfite lye, &c., remain in the solution. The quantity of acid or acid salts which may be added is dependent on the quantity of sulfurous acid contained in the sulfite lye. The more acid contained in said lye the smaller the addition required. Small excesses of lye and acid are not prejudicial. Horn solution in excess dissolves, however, the precipitate obtained and causes loss. By effecting the precipitation in the paper-pulp the latter is sized in a simple manner.

The above-described operation and the precipitation from the horn solution or the treatment of the aforesaid residue becomes more simple if from the beginning the bodies are in a very finely divided condition. They are then charged into high vats provided at their bottoms with sieves and the liquid serving to form compounds of the tanning principle is passed through from below. The whole vat remains filled with liquid, which is caused to flow very slowly through the apparatus, so that the fine ceratin substance may absorb the tanning principle from the lye as completely as possible.

If the liquid flowing out from one vat still contains tanning principles, it is passed through a second vat charged in the same manner. As soon as the body has been completely converted into a compound of the tanning principle in the first vat, which fact is recognized by the solubility of the body in diluted soda, the vat is emptied and charged again and the operation is carried out in the same manner as before, with this difference, however, that the second vat is now considered and used as the first vat and the freshly-charged vat as the second.

What I claim as new is—

1. The herein-described process for producing adhesive and sizing material from waste ceratin matters, consisting in dissolving the ceratin matter in water under pressure and at a temperature above 100° centigrade; then acidifying the solution and treating the same with lye from the sulfite-cellulose process, or the tanning principle thereof, for the production of a precipitate practically insoluble in water; then dissolving the precipitate in a soda solution, and, finally, concentrating the solution.

2. The herein-described process for producing adhesive and sizing material from waste ceratin matters, consisting in dissolving the ceratin matter in water under pressure and at a temperature above 100° centigrade; then acidifying the solution and treating the same with lye from the sulfite-cellulose process, or the tanning principle thereof, for the production of a precipitate practically insoluble in water; then dissolving the precipitate in a soda solution, and precipitating the sizing matter by acids, acid salts, or salts of alumina.

3. The herein-described process for producing adhesive and sizing material from waste ceratin matters, consisting in dissolving the ceratin matter in water under pressure and at a temperature above 100° centigrade; then acidifying the solution and treating the same with lye from the sulfite-cellulose process, or the tanning principle thereof, for the production of a precipitate practically insoluble in water; then dissolving the precipitate in a soda solution, and precipitating the sizing matter directly in the paper-pulp by the addition of acids, acid salts, or salts of alumina.

4. The herein-described process for producing a pure compound of ceratin and tanning principle, consisting in dissolving waste ceratin matter in water under pressure and at a temperature above 100° centigrade; then mixing the solution with highly-diluted neutralized sulfite lyes, or the tanning principle thereof, and then precipitating the compound with acids, acid salts, or salts of alumina.

5. The herein-described process for producing adhesive and sizing material from waste ceratin matters, consisting in dissolving the latter in water under pressure and at a temperature above 100° centigrade; then drawing off the liquid and treating the residue with a diluted caustic-soda solution.

6. The herein-described process for producing adhesive and sizing material from waste ceratin matters, consisting in dissolving the latter in water under pressure and at a temperature above 100° centigrade, then drawing off the liquid and treating the residue with a diluted soda solution in the presence of lime.

7. The herein-described process for producing adhesive and sizing material from waste ceratin matters, consisting in treating the finely-divided raw ceratin matter, or the masses last separated, with acidified sulfite-cellulose lye until it becomes soluble in a soda solution.

8. The herein-described process for producing adhesive and sizing material from waste ceratin matters, consisting in dissolving the ceratin matter in water under pressure and at a temperature above 100° centigrade; then acidifying the solution and treating the same with lye from the sulfite-cellulose process, or the tanning principle thereof, for the production of a precipitate practically insoluble in water, and dissolving the precipitate in a soda solution.

9. The herein-described method for producing a clear solution of ceratin matters, consisting in dissolving the matter in water under pressure and at a temperature above 100° centigrade by inducing a slow current of water to flow through the mass from above downward in a closed vessel and passing the solution through a filter.

10. The filter herein described consisting of a bottom provided with outlets, a plaited filter-cloth provided with bearings and intermediate pieces allowing the free passage of liquid, laths secured to the filter-bottom and clamping the filter-cloth, and stone plates—all constructed and arranged for working under high pressures, substantially as described.

In testimony whereof I have signed my name to this specification in the presence of two subscribing witnesses.

ALEXANDER MITSCHERLICH.

Witnesses:
G. BÜLLESBACH,
OSKAR MÜLLER.